April 19, 1960
G. H. MURRAY ET AL
2,932,984
TORSIONAL VIBRATION DAMPERS
Filed June 27, 1957
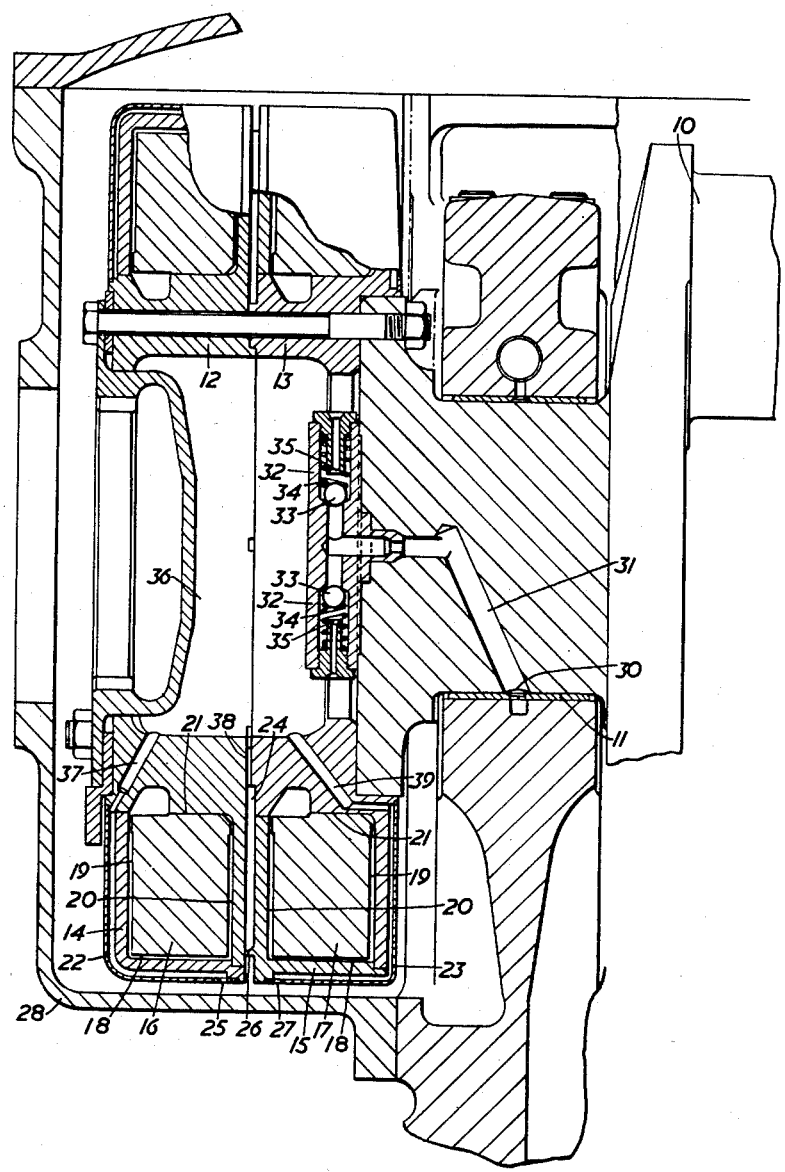
INVENTORS
GEORGE H. MURRAY
BRYAN R. BOYLE
BY
Watson, Cole, Grindle & Watson
ATTORNEYS

United States Patent Office 2,932,984
Patented Apr. 19, 1960

2,932,984

TORSIONAL VIBRATION DAMPERS

George H. Murray, Pinner, and Bryan R. Boyle, Shepperton, England, assignors to D. Napier & Son Limited, London, England, a company of Great Britain Application June 27, 1957, Serial No. 668,422

Claims priority, application Great Britain July 5, 1956

2 Claims. (Cl. 74—574)

This invention relates to viscosity type torsional vibration dampers of the kind comprising a casing within which is mounted an inner member capable of at least limited rotary movement relative to the casing and spaced from the internal surface of the casing by a small clearance to provide a viscous damping effect between the casing and the inner member when filled with a damping fluid of suitable viscosity.

Normally the casing is attached to a rotary member subject to torsional vibration while the inner member is free to rotate but is attached to, or itself constitutes a rotary mass having appreciable moment of inertia. The inner member thus tends to absorb the torsional vibrations through the medium of the viscosity of the oil. It will be understood however that in some cases the inner member may be connected to the part subject to torsional vibration while the casing is free to rotate.

The operation of such dampers is dependent primarily on the viscosity of the damping fluid which is liable to be affected by changes in temperature thereby materially altering the damping characteristics. It is an object of the invention to reduce such undesirable alterations.

A torsional vibration damper of the kind referred to therefore according to the present invention includes a cooling jacket at least partly surrounding the casing and means for passing a cooling fluid through the space between the jacket and the casing.

In order to provide efficient heat exchange, and to ensure that the temperature of the damping fluid is as far as possible constant, the cross section of the cooling space is restricted and the velocity of the cooling fluid through this space is relatively high.

In a preferred form of the invention the casing is formed to provide two separate internal cylindrical chambers, spaced axially apart, with an inner rotary member mounted within each of the chambers, and the damper includes a cooling space divided into at least two main parallel paths, with one path in contact with each of the end walls of the casing, and each of the paths includes a restricted metering orifice to balance the relative rates of flow through the paths.

Torsional vibration dampers of this kind are commonly applied to the crankshafts of reciprocating internal combustion engines. Such engines are subject to considerable torsional vibration over certain parts of their working range, but in most cases at relatively high speeds the amplitude of the vibrations tends to fall and a smoother torque output is obtained. The heat generated in the vibration damper therefore tends to fall at high speeds and it is unnecessary to provide the same degree of cooling. Similarly the required cooling effect is reduced at very low crankshaft speeds.

Thus according to another preferred feature of the invention the damper may include a fluid control valve in the cooling fluid circuit which is controlled automatically in response to the speed of rotation of the vibration damper and is arranged to cut off or reduce the flow of cooling fluid when the speed exceeds or falls below a predetermined value.

Thus the valve may be arranged to close automatically at relatively low speeds of rotation to shut off or reduce the flow of cooling fluid at speeds below this value.

The invention may be performed in various different ways but one specific embodiment will now be described by way of example with reference to the accompanying drawing which is a sectional side elevation.

In this example the damper is applied to one end of the crankshaft 10 of a reciprocating internal combustion engine. The end of the crankshaft is carried in a normal fixed bearing 11 and its outer end is secured to a casing assembly which comprises two ring members 12, 13, which have secured around their outer edges two corresponding annular cover plates 14, 15 thus forming two annular separate coaxial chambers. Mounted within these chambers are inner inertia members 16, 17 of annular form and of a cross section such as to substantially fill the respective annular chamber while providing a narrow clearance around its outer periphery 18 and on each of its annular faces 19, 20. Each of these inner members is located by a bearing surface 21 on its inner periphery, in contact with the adjacent face of the inner wall of the respective chamber, and is free to rotate within the casing. The inner inertia members 16, 17 are of considerable mass and correspondingly high moment of inertia, and the interior of the chambers is filled with a suitable damping fluid having the desired viscosity such that torsional vibrations of the crankshaft are at least partially absorbed by the inertia of the annular members and the viscosity of the oil in the clearance spaces 18, 19, 20.

The casing assembly 12, 13, 14, 15 is surrounded by a cooling jacket in the form of two annular half jackets 22, 23, which are spaced by a small clearance from the outer cover plates 14, 15 of the casing, this clearance being only slightly greater than the clearance between the inner surface of the casing and the adjacent faces of the inertia members 16, 17. An annular cooling passage 24 is also provided between the two annular chambers. The cooling space thus comprises three parallel paths, the two outer paths each including an annular section adjacent one of the end faces of the casing and a circumferential section surrounding part of the periphery of the casing. These three parallel cooling paths are each provided with restricted outlet metering orifices 25, 26, 27 arranged at the periphery of the cooling jacket in line with the division between the two annular chambers. A stationary surrounding cover 28 is provided to receive the cooling fluid which issues from these orifices.

Cooling oil is supplied to the cooling paths from the fixed bearing 11 of the crankshaft via a pick-up ring 30 in the end of the crankshaft where it passes through the fixed bearing. This ring communicates through a drilling 31 with a pair of centrifugally acting pressure relief valves 32. Each valve comprises a chamber containing a ball 33 off-set from the axis of the crankshaft and spring urged towards the axis away from a fluid outlet 35 at the outer end of the chamber where a valve seating is formed on which the ball rests when the speed rotation rises sufficiently to overcome the force of the spring 34. Thus at relatively high speeds the ball valves shut off the supply of cooling oil. Similarly at relatively low speeds the balls 33 are urged by the springs towards the rotary axis and close the fluid inlets to the valve chambers.

The outlets of the pressure relief valves 32 are connected to a cavity 36 in the interior of the casing within the two annular chambers, and from this cavity the cooling oil is distributed through a number of passages 37, 38, 39 into the three cooling paths referred to above.

What we claim as our invention and desire to secure by Letters Patent is:

1. A torsional vibration damper of the viscosity type comprising a fluid type sealed casing including two end walls and containing a viscous damping fluid, an annular inner member mounted within the casing capable of at least limited rotary movement relative to the casing, and with its opposite end surfaces spaced axially from the casing by a small clearance to provide a viscous damping effect between the casing and the inner member, and including a cooling jacket at least partly surrounding the casing and means for passing a cooling fluid through the space between the jacket and the casing, the said space being divided into at least two main parallel paths, with one path in contact with each of the axial end walls of the casing, each of the paths including a restricted metering orifice, said casing being formed to provide two separate internal cylindrical chambers spaced axially apart with an inner rotary member mounted within each of the chambers, and including a cooling space in the radial wall between the two chambers.

2. A torsional vibration damper of the viscosity type comprising a fluid type sealed casing including two end walls and containing a viscous damping fluid, an annular inner member mounted within the casing capable of at least limited rotary movement relative to the casing, and with its opposite end surfaces spaced axially from the casing by a small clearance to provide a viscous damping effect between the casing and the inner member, and including a cooling jacket at least partly surrounding the casing and means for passing a cooling fluid through the space between the jacket and the casing, and further including a fluid control valve in the cooling fluid circuit which is controlled automatically in response to the speed of rotation of the vibration damper and is arranged to reduce the flow of cooling fluid when the speed differs from a selected speed by a predetermined value.

References Cited in the file of this patent
UNITED STATES PATENTS

| | | |
|---|---|---|
| 2,659,243 | Darrieus | Nov. 17, 1953 |

FOREIGN PATENTS

| | | |
|---|---|---|
| 305,527 | Great Britain | Nov. 21, 1929 |